D. CURTIS.

Horse-Collars.

No. 5,250.

Reissued Jan. 21. 1873.

Witnesses
N. H. Sherburne
A. C. Linley

Inventor
Dexter Curtis
By Farwell Teo
his attys

AM. PHOTO-LITHOGRAPHIC CO. N.Y. (OSBORNE'S PROCESS.)

UNITED STATES PATENT OFFICE.

DEXTER CURTIS, OF SUN PRAIRIE, WISCONSIN.

IMPROVEMENT IN LININGS FOR WOODEN HORSE-COLLARS, &c.

Specification forming part of Letters Patent No. 126,682, dated May 14, 1872; reissue No. 5,250, dated January 21, 1873.

*To all whom it may concern:*

Be it known that I, DEXTER CURTIS, of Sun Prairie, in the county of Dane and State of Wisconsin, have invented certain new and useful Improvements in Linings for Ox-Yokes and Wooden Horse-Collars; and I do hereby declare the following to be a full, clear, and exact description of the same, reference being had to the accompanying drawing forming part of this specification, in which—

Figure 1:
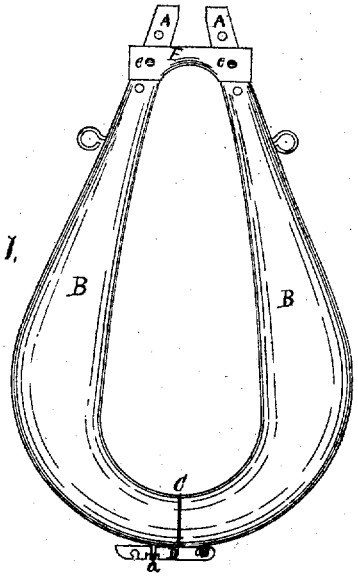
Figure 2:
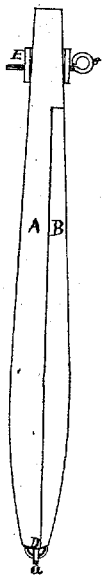

Figure 1 is a front elevation of a wooden horse-collar showing, the application of my improved lining; and Fig. 2, an edge view of the same.

Similar letters of reference in the drawing indicate corresponding parts.

My invention has for its object to provide an improved lining for ox-yokes and wooden horse-collars, which shall prevent the chafing or galling of the animal by the yoke or collar, and promote the healing of the flesh when thus galled or chafed. To this end the invention consists in the application of a zinc lining to such parts of the yoke or wooden collar as are liable to produce the gall or chafe, said lining being composed of a smooth continuous metal sheet or plate, formed in any suitable manner, to the shape of the part where it is to be applied, and having a zinc surface in contact with the flesh of the animal.

In the accompanying drawing, A is a wooden horse-collar, constructed in the usual form, and B is the zinc lining, struck up, pressed, or otherwise shaped to fit the bearing-surface of the collar, to which it is securely attached in any convenient manner.

The lining may be made in one piece to cover the sides and bottom of the collar, or the sides may be lined with a single piece each.

In using my improved lining in connection with ox-yokes, I attach it by any known means to the bearing-surfaces of the yoke as ordinarily constructed, so that it shall come in direct contact with the flesh of the ox. The zinc lining has both a mechanical and chemical effect, and has a tendency both to prevent and to cure chafing and galling.

The wooden horse-collar shown in the drawing is made in two parts, as shown at C, each part being provided at its lower end with a staple, *a*, upon one of which is secured a metal latch, D, provided with a series of notches, *d d*, formed at graduated distances across its lower edge, and is so arranged as to admit of a rocking movement, thereby allowing the same to be turned to the proper position to be passed through the opposite staple, *a'*, which latch is then turned to its normal position, allowing the staple to enter one of the notches, by which means the two parts of the collar are firmly connected. E is a clasp or yoke provided at each end with a slot or mortise, into which the upper portion of the collar is secured by pins *e e* passing through the same. The lower surface of said clasp is formed in proper shape to fit the upper portion of the neck, and is also faced with the zinc lining. The upper portion of the two parts of the collar is provided with a series of apertures arranged at graduated distances one from the other, through which the pins *e e* pass as the clasp or yoke is raised or lowered; the object of which, together with the notches formed in the latch, is to admit of adjusting the collar to the size of the horse's neck.

I do not, of course, confine the application of my improved lining to this particular collar, but design to apply it to wooden collars of whatever form or construction.

Having thus described my invention, what I claim is—

A sheet or plate zinc lining or facing for wooden horse-collars and ox-yokes, substantially as described, for the purpose specified.

DEXTER CURTIS.

Witnesses:

GEO. H. RICHARDS,
E. A. ELLSWORTH.